(12) United States Patent
Scharland et al.

(10) Patent No.: US 7,346,805 B1
(45) Date of Patent: Mar. 18, 2008

(54) PROTECTION OF MIRRORED DATA

(75) Inventors: Michael Scharland, Franklin, MA (US); Arieh Don, Newton, MA (US); Alexandr Veprinsky, Brookline, MA (US)

(73) Assignee: EMC Corporation, Hopkinton, MA (US)

( * ) Notice: Subject to any disclaimer, the term of this patent is extended or adjusted under 35 U.S.C. 154(b) by 409 days.

(21) Appl. No.: 10/673,836

(22) Filed: Sep. 29, 2003

(51) Int. Cl.
  *G06F 12/16* (2006.01)
(52) U.S. Cl. .................... 714/6; 714/21; 711/156; 711/162
(58) Field of Classification Search .................. None
  See application file for complete search history.

(56) References Cited

U.S. PATENT DOCUMENTS

| | | | |
|---|---|---|---|
| 6,035,412 A * | 3/2000 | Tamer et al. ................. 714/6 |
| 6,289,357 B1 * | 9/2001 | Parker ........................ 707/202 |
| 6,496,908 B1 * | 12/2002 | Kamvysselis et al. ...... 711/162 |
| 6,954,835 B1 * | 10/2005 | Lecrone et al. ............ 711/162 |
| 2003/0212860 A1 * | 11/2003 | Jiang et al. ................. 711/114 |
| 2003/0221077 A1 * | 11/2003 | Ohno et al. ................. 711/165 |
| 2004/0260873 A1 * | 12/2004 | Watanabe .................... 711/114 |

\* cited by examiner

*Primary Examiner*—B. James Peikari
(74) *Attorney, Agent, or Firm*—Fish & Richardson P.C.

(57) ABSTRACT

A method for storing data includes writing the data to a temporary storage location and buffering a mirror request to copy the data from the temporary storage location to a mirror. Once all the data is present, the validity of the data is determined. If the data is valid, the mirror request is executed. Otherwise, the mirror request is deleted.

11 Claims, 5 Drawing Sheets

PROTECTION OF MIRRORED DATA

FIELD OF INVENTION

This invention relates to data storage, and in particular, to remote mirroring of data.

BACKGROUND

Because of the potentially catastrophic consequences of data loss, many data storage systems are "mirrored." In such systems, data sent by a host is stored both at a primary data storage system and at a remote data storage system, referred to herein as a "mirror system." The redundant storage of data in this manner avoids data loss should the primary data storage system be destroyed.

The goal of a mirrored data storage system is to ensure that the data at the mirror system is at all times identical to the data at the primary data storage system. In an attempt to accomplish this, data is first stored in a cache at the primary data storage system. The primary data storage system then causes the data to be sent to the remote mirror system. Upon storing the data in its own cache, the remote mirror system sends the primary data storage system an acknowledgment. The primary data storage system them sends the host an acknowledgment. As a result, the host receives an acknowledgement only when the data is safely stored at both the primary and the remote systems.

In some cases, data sent to the primary data storage system becomes corrupted. For this reason, many data storage systems save a back-up copy of old data before overwriting it with new data. The primary data storage system then checks the integrity of the new data upon receiving that data. If the new data is found to be corrupted, the primary data storage system restores the old data and notifies the host that the attempt to overwrite the old data with new data failed. The host then makes another attempt to overwrite the old data with the new data.

When remote mirroring is implemented, it is possible for a mirroring event to occur while the corrupted data is still in the cache, before the host has had a chance to re-send the new data to the primary data storage system. If this occurs, then the corrupted data will be copied to the remote mirror system. The data at the primary data storage system and at the mirror system will thus diverge. This is contrary to the purpose of a mirrored data storage system. Should the primary data storage system be destroyed at this point, only the corrupted data at the remote mirror will be available.

In one aspect the invention includes a method for storing data by writing the data to a temporary storage location, buffering a mirror request to copy the data from the temporary location to a mirror, and then determining the validity of the data written to that temporary storage location. If the data is valid, a mirror request is sent for execution. If, on the other hand, the data is invalid, the buffer mirror request is deleted.

In one embodiment, writing of the data to a temporary storage location includes writing first and second portions of the data to respective first and second slots within the temporary storage location. This can include the additional step of buffering a mirror request for each of the first and second portions. In such a case, the invention can include sending all the buffered mirror requests for execution if the data is determined to be valid. Conversely, if the data is determined to be invalid, the invention can include deleting all the buffered mirror requests.

In another aspect, the invention includes a method for storing data by writing first and second portions of the data to respective first and second temporary storage locations. First and second mirror requests are then buffered. These mirror request are intended to copy the first and second portions from their respective storage locations to a mirror. The validity of the data is then determined. If the data is valid, the mirror requests are sent for execution. If, on the other hand, the data is invalid, the first and second mirror requests are deleted.

In another aspect, the invention includes a method for storing data by writing the data to a temporary storage location and buffering a mirror request for copying that data from the temporary storage location to a mirror. The data is then examined to determine if it is valid. If the data proves to be invalid, the mirror request is deleted.

Another aspect of the invention provides a method for storing data by writing first and second portions of the data to respective first and second temporary storage locations. First and second mirror requests are then buffered. These mirror requests are intended to copy the first and second portions from the first and second temporary storage locations to a mirror. The data is then examined to determine its validity. If the data proves to be invalid, the first and second mirror requests are deleted.

In another aspect, the invention includes a data storage system for storing data provided by a host. The system includes a host adaptor for communicating with the host, a cache memory in communication with the host adaptor for temporary storage of data, and a mirror queue for queuing mirror requests for copying selected data from the cache memory to a mirror. A holding pen accumulates mirror requests prior to sending the mirror requests to the mirror queue.

In one embodiment, the host adaptor includes a local memory and the holding pen is maintained in the local memory. However, in other embodiments a holding pen is maintained in the cache memory.

The invention optionally includes a remote adaptor configured to inspect the mirror queue and to copy selected data from the cache memory to a mirror in response to mirror requests queued therein.

Unless otherwise defined, all technical and scientific terms used herein have the same meaning as commonly understood by one of ordinary skill in the art to which this invention belongs. Although methods and systems similar or equivalent to those described herein can be used in the practice or testing of the present invention, suitable methods and systems are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

Other features and advantages of the invention will be apparent from the following detailed description, and from the claims.

DETAILED DESCRIPTION

Figure 1:
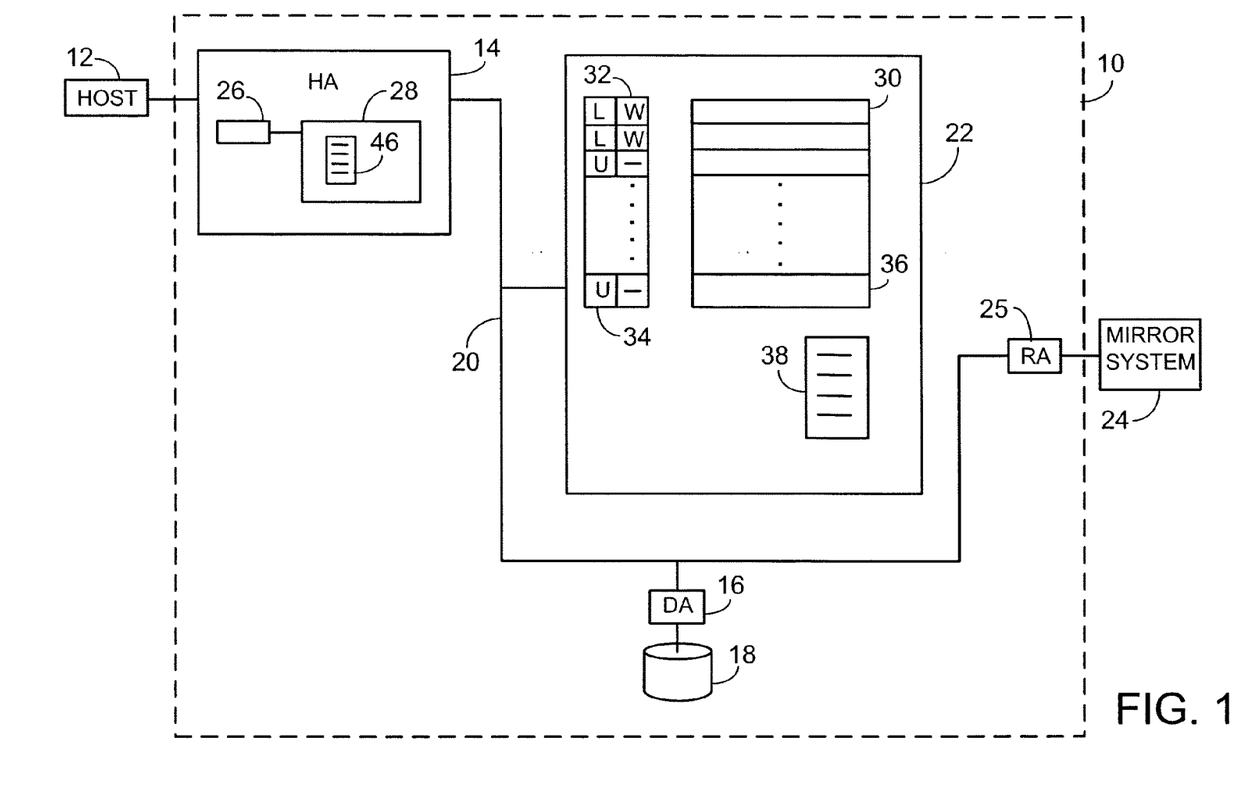
FIG. 1 shows a primary data storage connected to two remote mirrors.

FIG. 1 shows a primary storage system 10 that communicates with a host 12 through a host-adaptor 14. The primary storage system 10 includes a disk-adaptor 16 in communication with a disk 18 or other mass storage device. A bus 20 connected to the host-adaptor 14 and to the disk-adaptor 16 enables them to access a global memory 22, also connected to the bus 20.

For a variety of reasons, including data security and load balancing, it is often desirable to maintain a current copy of the data stored in the primary storage system 10 at another location. This additional location is referred to as a mirror system 24. A remote-adaptor 25 connected to the bus 20 carries out the transfer of data between the cache 22 and the mirror system 24. A method for mirroring in a data storage system of the type illustrated in FIG. 1 is described in Yanai et al., U.S. Pat. No. 5,742,792 issued on Apr. 21, 1998, the contents of which are herein incorporated by reference.

The mirror system 24 is architecturally the same as the primary storage system 10 that it serves. In fact, the terms "mirror system" and "primary storage system" are logical terms that designate the function of a physical installation at a particular instant. A particular physical installation can be both a primary storage system backed up by a mirror system or a mirror system for another primary storage system.

The illustration of the primary storage system 10 in FIG. 1 is simplified to illustrate the principles of the invention. In reality, the primary storage system 10 can service several hosts, using several host-adaptors, each of which accesses cache 22 using the bus 20. In addition, the primary storage system 10 can include several disk-adaptors for communicating with several disk sets or other mass storage devices, and several remote-adaptors for communication with several mirrors. Each host-adaptor 14 includes its own processor 26 and local memory 28. A host-adaptor 14 is thus a complete processing system that can execute a process that accesses both its own local memory 28 and the cache 22.

The cache 22 is divided into temporary-storage locations, referred to as "cache slots," or simply "slots 30," Each slot 30 has a data storage capacity of 32 KB. It is thus convenient for the host-adaptor 14 to be configured so that it writes no more than 32 KB at a time. Should a host 12 request that a larger amount of data be written, the host-adaptor 14 divides that data into 32 KB portions and carries out the write one portion at a time.

Each slot 30 has associated with it a "write-pending" flag 32. When set, the write-pending flag 32 indicates that the slot 30 contains data that has not yet been sent to a mirror system 24.

Each slot 30 also has an associated lock 34. In FIG. 1, the locks 34 are shown beside their corresponding slots 30 to illustrate the association between slots 30 and locks 34. However, there is no requirement that the lock and the slot occupy continuous portions of memory.

Before accessing a slot 30, a process must "hold" the lock 34 for that slot 30. This can only occur if no other process holds the lock 34. When the process no longer requires access to the slot 30, it releases the lock 34. This ensures that another process will later be able to access that slot 30.

Figure 2:
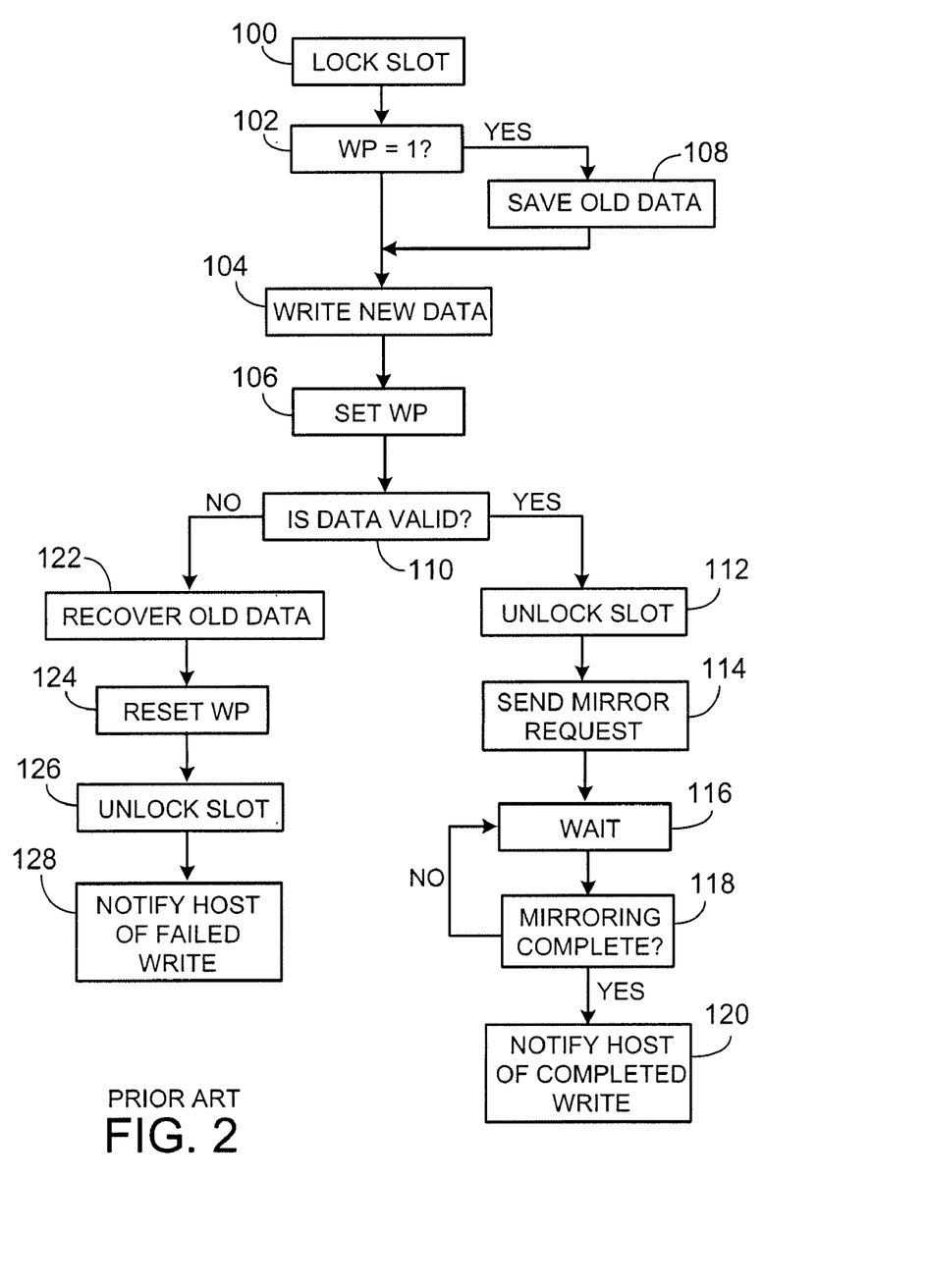
FIG. 2 shows a known method for writing data to a mirrored slot.

FIG. 2 shows the basic logic carried out by a known host-adaptor 14 in response to a write request by a host 12. The host-adaptor first locks the slot 30 (step 100) to prevent any other process from accessing it. It then determines whether it must take measures to protect the data already in the slot 30 (referred to herein as the "old data") in case the data specified by the write request (referred to herein as the "new data") becomes corrupted. To this end, the host-adaptor 14 inspects the write-pending flag 32 (step 102).

A cleared write-pending flag 32 indicates that the old data has already been sent to a mirror system 24. In that case, the host-adaptor 14 recognizes that is safe to overwrite the old data with the new data. The host-adaptor 14 then writes the new data into the slot 30 (step 104) and sets the write-pending flag 32 (step 106).

A set write-pending flag 32 means that the old data in the slot 30 is the only copy of that data available. In that case, the host-adaptor 14 saves the old data into a scratch buffer 36 in cache 22 (step 108). With the old data now safe in a scratch buffer 36, the host-adaptor 14 writes the new data into the slot 30 (step 104) and sets the write-pending flag 32 (step 106).

Once the new data has been written to the slot 30, the host-adaptor 14 inspects the new data to determine if it is valid (step 110). If the new data is valid, the host-adaptor 14 unlocks the slot 30 (step 112) and submits a remote mirror-request (hereafter referred to as a "mirror-request") to a remote mirror-queue 38 (hereafter referred to as a "mirror queue") in the cache 22 (step 114). A remote-adaptor 25 periodically scans the mirror-queue 38 and executes whatever mirror-requests it finds. When the remote-adaptor 25 finishes executing a mirror-request, it notifies the host-adaptor 14 and clears the write-pending flag 32 associated with the slot 30 to indicate that the data in the slot 30 now matches the data in the mirror system 24.

Meanwhile, the host-adaptor 14 waits until the mirror-request has been carried out by a remote-adaptor 25 (steps 116, 118). Upon receiving the message from the remote-adaptor 25 indicating completion of the mirror-request, the host-adaptor 14 notifies the host 12 that the write has been successfully completed (step 120).

If, on the other hand, the data proves to be invalid, the host adaptor overwrites the invalid new data with the old data saved in the scratch buffer 36 (step 122). The host-adaptor 14 then resets the write-pending flag 32 to whatever state it was in when the host-adaptor 14 first held the lock 30 for the slot 30 (step 124). Then, the host-adaptor 14 unlocks the slot 30 (step 126) and sends a message to the host-adaptor 14 indicating that the write was unsuccessful (step 128).

The logic shown in FIG. 2 ensures that a mirror-request is only issued when the new data has been confirmed as valid. This prevents invalid data from being inadvertently replicated at the mirror system 24.

Figure 3:
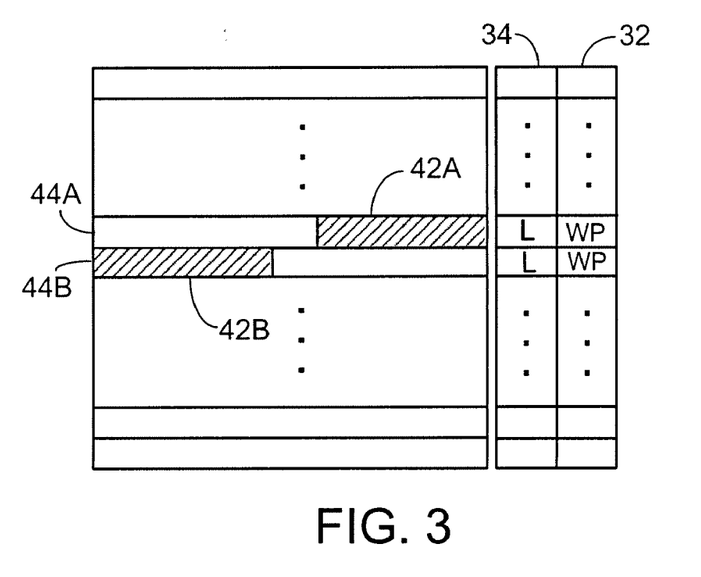
FIG. 3 shows data spanning two slots.

A difficulty associated with the logic of FIG. 2 is that in some cases, a write request made by the host 12 specifies new data that is to extend over more than one slot. For example, as shown in FIG. 3, the new data may consist of a 32K segment having a first portion 42A to be written into a first slot 44A and a second portion 42B to be written into a second slot 44B. In such cases, the step of determining the validity of the data in FIG. 2 cannot be carried out because only the first portion 42A is available. The second portion 42B has not yet been written to the second slot 44B. Thus, the step of determining the validity of the data contained in a 32K segment must be postponed until the entire 32K segment is available, i.e. when the first and second portions 42A-B have both been written.

One proposed approach to handling the case in which the new data spans two slots is to write the first portion 42A to the first slot 44A, unlock the first slot 44A, lock the second slot 44B, write the second portion 42B to the second slot 44B, and then inspect the first and second portions 42A-B together. However, the danger in this approach is that while the first slot 44A is unlocked, any pending mirror-request for the first slot 44A may execute. If this occurs, invalid data may be copied to the mirror system 24.

Another approach is to keep the first slot 44A locked until the second portion 42B of the data has been written to the second slot 44B. A difficulty with this approach is that the existing logic shown in FIG. 2 results in a deadlock, during which the host adaptor 14 waits for the remote mirroring to complete and the remote adaptor 25 waits for the host adaptor to unlock the slot 30. This approach would therefore require extensive rewriting and testing of existing code.

The method described herein relies on the maintenance of a holding pen 46 into which the host-adaptor 14 can accumulate mirror-requests on a slot-by-slot basis without actually exposing those mirror-requests to the remote-adaptor 25. When the host-adaptor 14 is satisfied that the data in all the slots used in a particular write request is valid, it sends the accumulated mirror-requests from the holding pen 46 into the mirror-queue 38. The remote-adaptor 25 then executes these mirror-requests. In one embodiment, the holding pen 46 is maintained in the local memory 28 of the host-adaptor 14. However, the holding pen 46 can also be maintained in the cache 22. What is important is that mirror-requests in the holding pen 46 be shielded from execution by the remote-adaptor 25 until the all the data is confirmed as valid.

Figure 4:
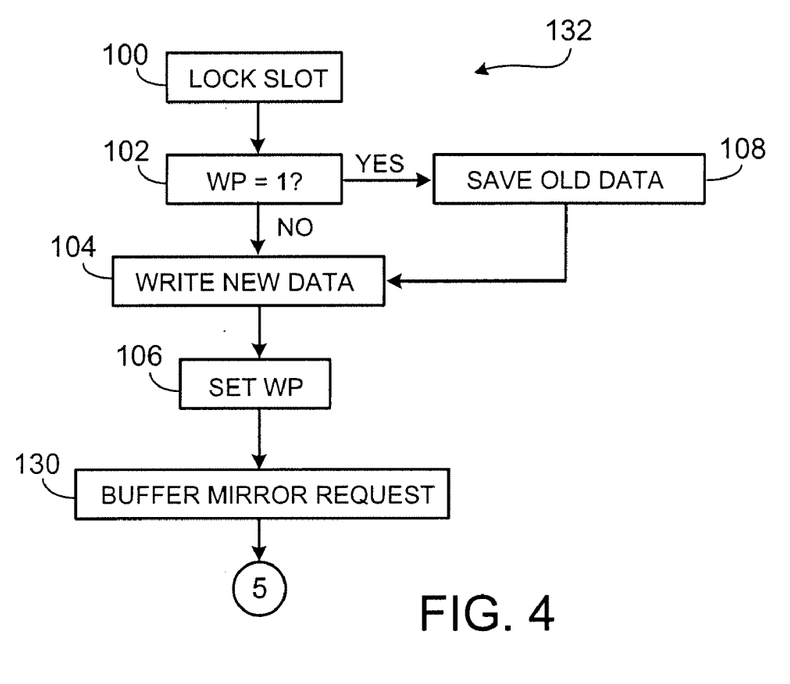
FIG. 4 shows a method for carrying out a pre-end slot write.
Figure 5:
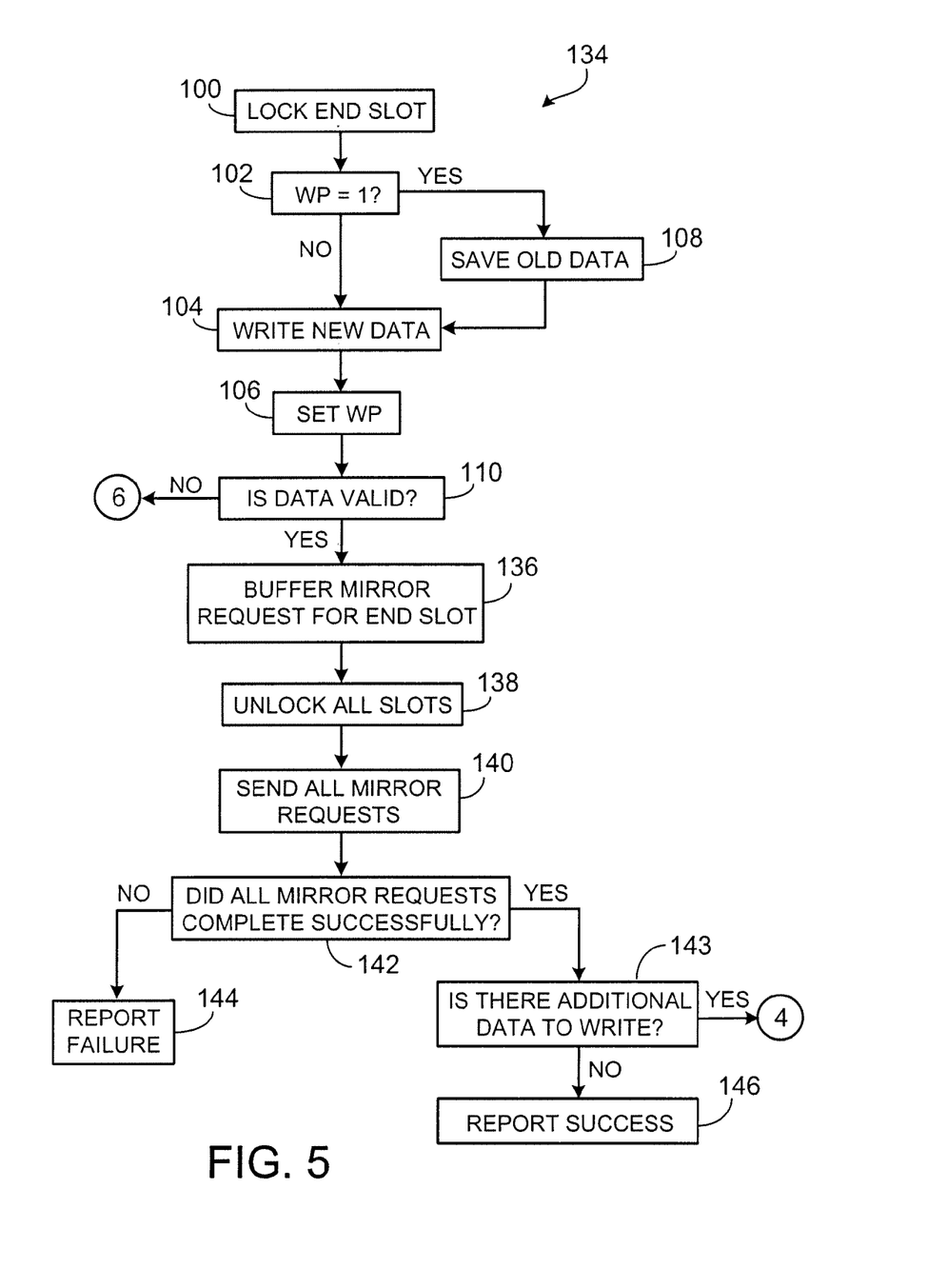
FIG. 5 shows a method for carrying out an end-slot write.
Figure 6:
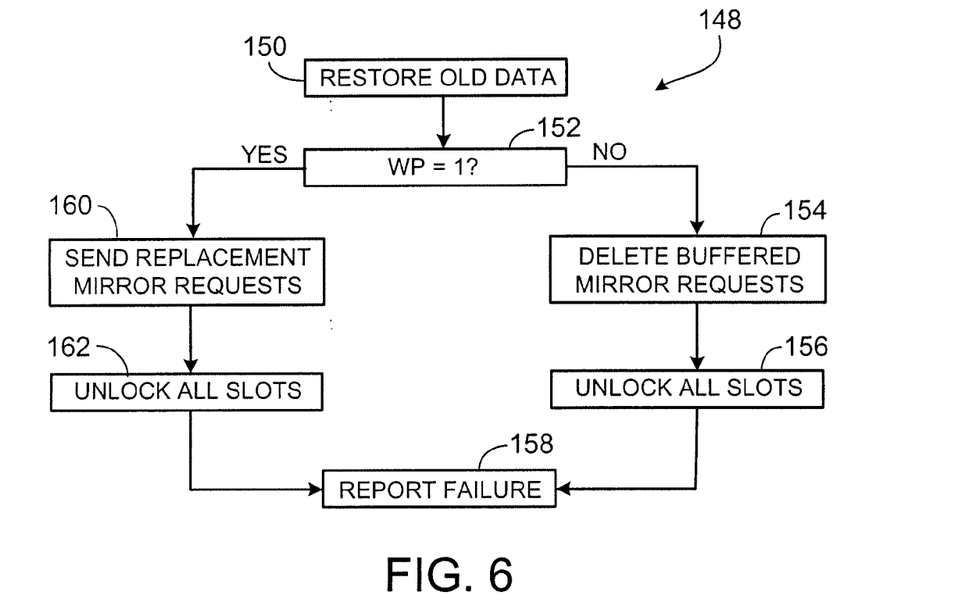
FIG. 6 shows an error recovery method.

FIGS. 4-6 show the procedure carried out by the host-adaptor 14 upon being instructed to write new data having a first portion 42A that is to be written to a first slot 44A and a second portion 42B that is to be written to the second slot 44B.

Pre-End Slot Write

Referring first to FIG. 4, the host-adaptor 14 begins by writing the first portion 42A to the first slot 44A. The procedure begins with steps that are the same as those already discussed in connection with FIG. 2 (steps 100, 102, 104, 106, 108). It is after the host-adaptor 14 writes the first portion 42A and sets the write-pending flag that the procedure begins to deviate from that shown in FIG. 2. In particular, the method shown in FIG. 4 lacks the step of checking data integrity (step 110) because no such check is possible until the second portion 42B has also been written to the second slot 44B.

Instead, the host-adaptor 14 creates a mirror-request and buffers it in the holding pen 46 (step 130). This mirror-request will not be sent for execution until the host-adaptor 14 confirms the validity of the data. The procedure shown in FIG. 4, beginning with the locking of the first slot 44A and the buffering of the silent mirror-request in the holding pen 46 shall be referred to as a pre-end slot write 132.

End-Slot Write

After buffering the silent mirror-request for the first slot 44A, the host-adaptor 14 begins the end-slot write 134 shown in FIG. 5. The end-slot write begins in the same was as the pre-end slot write 132, with the locking of the second slot 44B in preparation for writing the second portion 42B of the data (step 100). Note that the first slot 44A continues to be locked. This ensures that the first portion 42A of the data, which may after all be corrupted, remains inaccessible. The next few steps are identical to those discussed in connection with FIG. 2 (steps 102, 104, 106, 108).

At this point in the procedure, both the first portion 42A and the second portion 42B are available. Accordingly, it is now possible to determine the integrity of the data (step 110).

If the new data proves to be valid, the host-adaptor 14 creates a mirror-request and buffers it in the holding pen 46 (step 136). It then unlocks both the first and second slots 44A-B (step 138) and sends the mirror-requests to the mirror-queue 38 in the cache 22 (step 140). These mirror-requests are then executed by a remote-adaptor 25. (In some cases, the two mirror-requests may be executed by two different remote-adaptors, however there is no significant difference in the procedure when this is the case.)

Upon completion of the mirror-requests, the remote-adaptor 25 clears the write-pending flags associated with the first and second slots 44A-B. This indicates that the data in the first and second slots 44A-B now matches the data in the mirror system 24. In addition, upon completion of the both mirror-requests, the remote-adaptor 25 sends a message to the host-adaptor 14 indicating that that request has been completed.

The host-adaptor 14 waits until both mirror-requests are complete (step 142). The details of this step are well known and include executing a timer to impose an upper limit on the length of the wait. The host adaptor 14 then determines whether there is additional data to write to the present slot (step 143). If there is additional data, the host adaptor 14 carries out the procedure shown in FIG. 4. Otherwise, the host adaptor 14 sends a confirmation message to the host 12 (step 146).

If the host-adaptor 14 is unable to confirm the completion of either one of the mirror-requests, it reports the write failure to the host 12 (step 144).

Error Recovery

If, on the other hand, the new data proves to be invalid, the host-adaptor 14 executes the error recovery procedure 148 shown in FIG. 6 for each slot 33A-B involved in the write. Referring now to FIG. 6, the host-adaptor 14 restores the old, but valid, data for both slots (step 150). Having done so, the host-adaptor 14 examines the write-pending flags 32 for each slot 33A-B (step 152).

A clear write-pending flag 32 on both slots 44A-B indicates that the data in the two slots 44A-B, which has just been restored and is therefore known to be valid, matches the corresponding data stored on the mirror system 24. This means that the data on the mirror system 24 is also valid. There is, therefore, no need to execute the mirror requests in the holding pen 46. As a result, the host-adaptor 14 deletes those mirror requests (step 154), unlocks both slots 44A-B (step 156), and reports the write failure to the host 12 (step 158).

A set write-pending flag 32 indicates that there is a mismatch between the data in the slots 44A-B, which is known to be valid, and the corresponding data stored on the mirror system 24. This means that the stored data on the mirror system 24 is obsolete and needs to be updated. In this case, the host-adaptor 14 sends first and second mirror requests to the remote adaptor 25 (step 160), unlocks both slots 44A-B (step 156)), and reports the write failure to the host 12 (step 158).

These mirror requests are "silent" mirror requests that cause the valid data in the first and second slots 44A-B to be copied to the mirror system 24. Unlike a conventional mirror request, a silent mirror request does not report its completion to the host-adaptor 14. Thus, a host-adaptor 14 that has issued a silent mirror request does not wait for the completion of that request.

The foregoing method can be adapted to the case in which the data is contained within a single slot. In such a case, only the end-slot write 134 is executed. The holding pen 46 in this case holds only a conventional mirror-request, and no silent mirror-request. The step of unlocking all slots (step 138) requires the unlocking of only a single slot 30.

The foregoing method can also be adapted to new data that spans three or more slots. The writing of such new data can be viewed as a succession of two-slot writes as described in connection with FIGS. 3-6.

Figure 7:
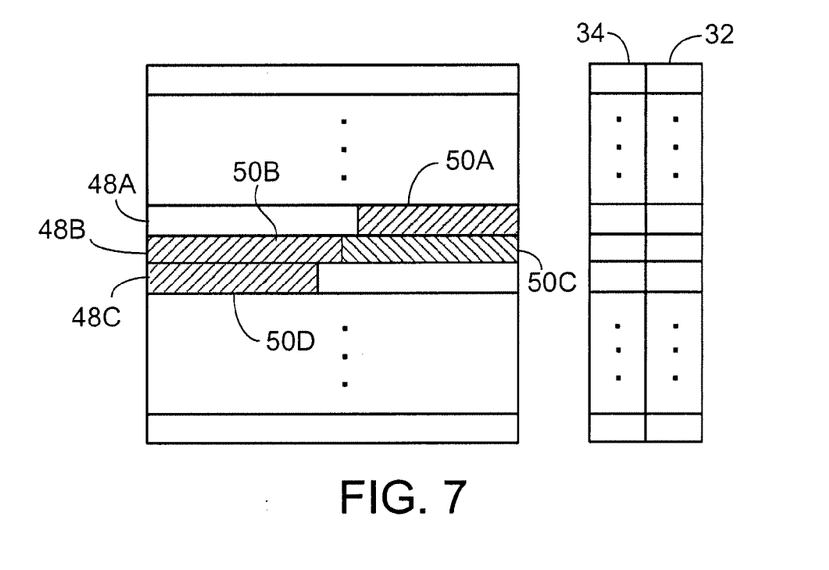
FIG. 7 shows data spanning three slots.

FIG. 7 shows data spanning three slots 48A-C. The data includes a first portion 50A in a first slot 48A, second and third portions 50B-C in a second slot 48B, and a fourth portion 50D in a third slot 48C. To write the data shown in FIG. 7, the host-adaptor 14 writes the first and second portions 50A-B using the procedures set forth in FIGS. 3-6. A difference, however, occurs when the host adaptor 14 determines that there is additional data, namely the third portion 50C, to write to the present slot 48B (step 143). In this case, the host-adaptor 14 proceeds to execute the procedure shown in FIG. 4, with the slot locked in step 100 being now being the second slot 48B. Execution of FIG. 4 then leads to re-execution of the procedure set forth in FIG. 5.

A multi-slot write as described above results in the transmission of data to the remote adaptor 25 at the completion of each 32K segment of the data. For example, the mirror requests associated with the first and second portions 50A-B of the data are sent to the mirror queue 38 separately from the mirror requests associated with the third and fourth portions 50C-D of the data. In this case, if an error occurs in a particular 32K segment, only that segment has to be re-sent by the host 12.

In another practice of the invention, the host-adaptor 14 accumulates all the mirror requests in the holding pen 46. Upon verification of all the 32K segments included in the write, the host-adaptor 14 sends all the mirror requests to the mirror queue 38 at the same time.

Having described the invention, and a preferred embodiment thereof, what we claim as new and secured by Letters Patent is:

1. A method for storing selected data that spans multiple slots, the method comprising:
   writing a plurality of constituent portions of the selected data to respective slots within a temporary storage location,
   buffering a plurality of mirror requests, each of which corresponds to one of the constituent portions of the selected data, to copy a corresponding constituent portion of the selected data from the temporary storage location to a mirror;
   determining the validity of the selected data written to the temporary storage location; and
   if the selected data written to the temporary storage location is valid, sending the plurality of buffered mirror requests for execution, whereby upon execution of all the mirror requests, the selected data will have been mirrored; and
   if the selected data written to the temporary storage location is invalid, deleting the plurality of buffered mirror requests,
   whereby mirror requests for the constituent portions of the selected data are sent for execution only if the selected data is valid.

2. The method of claim 1, further comprising sending all the buffered mirror requests for execution if the selected data is determined to be valid.

3. The method of claim 1, further comprising deleting all the buffered mirror requests if the selected data is determined to be invalid.

4. The method of claim 1, wherein buffering a plurality of mirror requests comprises buffering the mirror requests in a memory location separate from the temporary storage location.

5. A method for storing selected data that spans multiple slots, the method comprising:
   writing a first constituent portion of the selected data to a first temporary storage location;
   buffering a first mirror request to copy the first constituent portion of the selected data from the first temporary storage location to a mirror;
   writing a second constituent portion of the selected data to a second temporary storage location;
   buffering a second mirror request to copy the second constituent portion of the selected data from the second temporary storage location to the mirror;
   determining the validity of the selected data;
   if the selected data is valid, sending the first and second buffered mirror requests for execution;
   if the selected data is invalid, deleting the first and second buffered mirror requests;
   whereby the constituent portions of the selected data are mirrored only if the selected data is valid.

6. A method for storing selected data that spans multiple slots, the method comprising:
   writing the selected data to a temporary storage location;
   buffering a plurality of mirror requests for copying corresponding constituent portions of the selected data from the temporary storage location to a mirror;
   determining that the selected data written to the temporary storage location is invalid; and
   deleting the plurality of buffered mirror requests
   whereby buffered mirrored requests for constituent portions of the selected data are prevented from being executed when the selected data is invalid.

7. A method for storing selected data that spans multiple slots, the method comprising:
   writing a first constituent portion of the selected data to a first temporary storage location;
   buffering a first mirror request to copy the first constituent portion from the first temporary storage location to a mirror;
   writing a second constituent portion of the selected data to a second temporary storage location;
   buffering a second mirror request to copy the second constituent portion from the second temporary storage location to the mirror;
   determining that the selected data is invalid;
   if the selected data is invalid, deleting the buffered first and second mirror requests
   whereby mirror requests for mirroring constituent portions of the selected data are executed only if the selected data is valid.

8. A computer-readable memory device having encoded thereon software for causing storage of selected data that spans multiple slots, the software comprising instructions that, when executed, causes a data storage system to:
   write a plurality of constituent portions of the selected data to respective slots within a temporary storage location, buffer a plurality of mirror requests, each of which corresponds to one of the constituent portions of the data, to copy a corresponding constituent portion of the selected data from the temporary storage location to a mirror;

determine the validity of the selected data written to the temporary storage location; and if the selected data written to the temporary storage location is valid, send the plurality of buffered mirror requests for execution, whereby upon execution of all the mirror requests, the selected data will have been mirrored; and if the data written to the temporary storage location is invalid, delete the plurality of buffered mirror requests, whereby mirror requests for the constituent portions of the selected data are sent for execution only if the selected data is valid.

9. The computer-readable memory device of claim 8, wherein the software further comprises instructions that, when executed, cause a data-storage system to send all the buffered mirror requests for execution if the selected data is determined to be valid.

10. The computer-readable memory device of claim 8, wherein the software further comprises instructions that, when executed, cause the data storage system to delete all the buffered mirror requests if the selected data is determined to be invalid.

11. The computer-readable memory device of claim 8, wherein the instructions for buffering a plurality of mirror requests comprise instructions that, when executed, cause the data storage system to buffer the mirror requests in a memory location separate from the temporary storage location.

* * * * *